(12) United States Patent
Hatakeda et al.

(10) Patent No.: US 10,396,380 B2
(45) Date of Patent: Aug. 27, 2019

(54) ON-VEHICLE FUEL CELL SYSTEM

(71) Applicant: HONDA MOTOR CO., LTD., Tokyo (JP)

(72) Inventors: Tomohiko Hatakeda, Wako (JP); Ryoichi Yoshitomi, Wako (JP); Tomohiro Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 374 days.

(21) Appl. No.: 15/296,047

(22) Filed: Oct. 18, 2016

(65) Prior Publication Data

US 2017/0117564 A1    Apr. 27, 2017

(30) Foreign Application Priority Data

Oct. 22, 2015  (JP) .................. 2015-208053

(51) Int. Cl.
*H01M 8/10* (2016.01)
*H01M 8/04791* (2016.01)
*H01M 8/04082* (2016.01)
*H01M 8/1018* (2016.01)
*H01M 8/241* (2016.01)
*H01M 8/0662* (2016.01)

(52) U.S. Cl.
CPC ... *H01M 8/04805* (2013.01); *H01M 8/04201* (2013.01); *H01M 8/0662* (2013.01); *H01M 8/1018* (2013.01); *H01M 8/241* (2013.01); *H01M 2008/1095* (2013.01); *H01M 2250/20* (2013.01); *Y02T 90/32* (2013.01)

(58) Field of Classification Search
CPC ......... H01M 8/04805; H01M 8/04201; H01M 8/0662; H01M 8/1018; H01M 8/241; H01M 2008/1095; H01M 2250/20
See application file for complete search history.

(56) References Cited

FOREIGN PATENT DOCUMENTS

JP    2007018910 A    *  1/2007
JP    2008-123872        5/2008

* cited by examiner

Primary Examiner — Jane J Rhee
(74) Attorney, Agent, or Firm — Mori & Ward, LLP

(57) ABSTRACT

A fuel cell includes a cathode side and an anode side. An oxidant gas is fed to the cathode side. In the cathode side, an oxidant exhaust gas is generated by using the oxidant gas. A fuel gas is fed to the anode side. In the anode side, a fuel exhaust gas is generated by using the fuel gas. The oxidant exhaust gas and the fuel exhaust gas are discharged from an outlet of a mixed exhaust gas discharge pipe as a mixed exhaust gas. The dilution apparatus is connected to the outlet of the mixed exhaust gas discharge pipe. The dilution apparatus includes a stirring chamber and an opening. The stirring chamber communicates with the mixed exhaust gas discharge pipe and expands from the outlet of the mixed exhaust gas discharge pipe. The opening is provided in the stirring chamber to take in air.

20 Claims, 9 Drawing Sheets

ON-VEHICLE FUEL CELL SYSTEM

CROSS-REFERENCE TO RELATED APPLICATIONS

The present application claims priority under 35 U.S.C. § 119 to Japanese Patent Application No. 2015-208053, filed Oct. 22, 2015, entitled "On-Vehicle Fuel Cell System." The contents of this application are incorporated herein by reference in their entirety.

BACKGROUND

1. Field

The present disclosure relates to an on-vehicle fuel cell system.

2. Description of the Related Art

For example, a solid polymer electrolyte fuel cell includes an electrolyte membrane electrode assembly (MEA) having an electrolyte membrane that is a polymer ion-exchange membrane, on one face of which an anode electrode is provided, and on the other face of which a cathode electrode is provided. The electrolyte membrane electrode assembly is held between separators to constitute a power generation cell (unit cell). Generally, a predetermined number of power generation cells are stacked to form an on-vehicle fuel cell stack, which is incorporated to a fuel cell vehicle (such as fuel cell electric vehicles).

In the fuel cell vehicle, when used fuel gas that has been supplied to a fuel cell and discharged from the anode electrode (hereinafter also referred to as fuel exhaust gas), is discharged to the outside, the concentration of hydrogen is declined to a predetermined concentration or less, by using a dilution apparatus.

For example, in a dilution apparatus for exhaust gas disclosed in Japanese Unexamined Patent Application Publication No. 2008-123872, fuel exhaust gas discharged from a fuel cell via an fuel gas exhaust pipe is introduced into a dilation container via an exhaust gas inlet pipe. Oxidation gas fed via an oxidation gas exhaust pipe is guided into the dilution container via a dilution gas inlet pipe, and is discharged into the dilution container through a discharge hole.

The fuel exhaust gas introduced via the exhaust gas inlet pipe is mixed and diluted with the oxidation gas discharged through the discharge hole to generate mixed gas. Then, the mixed gas is sucked into a suction hole of the dilution gas inlet pipe, and is mixed with oxidation gas also in the dilution gas inlet pipe. The mixed gas is transported to the outside of the dilution container. In this manner, the mixed gas diluted with the oxidation gas can be discharged to the outside.

SUMMARY

According to one aspect of the present invention, the on-vehicle fuel cell system includes a fuel cell that generate electricity through electrochemical reaction of oxidant gas fed to a cathode side with fuel gas fed to an anode side with an electrolyte membrane being located between the cathode side and the anode side.

The on-vehicle fuel cell system further includes an oxidant gas feeding pipe, an oxidant exhaust gas discharge pipe, a fuel gas feeding pipe, a fuel exhaust gas discharge pipe, a mixed exhaust gas discharge pipe, and a dilution unit. The oxidant gas feeding pipe feeds oxidant gas to the fuel cell, while the oxidant exhaust gas discharge pipe discharges oxidant exhaust gas, which is oxidant gas at least partially used in the cathode side, from the fuel cell.

The fuel gas feeding pipe feeds fuel gas to the fuel cell, while the fuel exhaust gas discharge pipe discharges fuel exhaust gas, which is oxidant gas at least partially used in the anode side, from the fuel cell. The mixed exhaust gas discharge pipe connects the oxidant exhaust gas discharge pipe to the fuel exhaust gas discharge pipe, and discharges mixed exhaust gas of oxidant exhaust gas and fuel exhaust gas, while the dilution unit is connected to the mixed exhaust gas discharge pipe.

The dilution unit includes a stirring chamber that expands from an outlet of the mixed exhaust gas discharge pipe and communicates with the mixed exhaust gas discharge pipe, and an opening for taking air is formed in a lower face of the stirring chamber.

According to another aspect of the present invention, an on-vehicle fuel cell system includes a fuel cell, an oxidant gas feeding pipe, an oxidant exhaust gas discharge pipe, a fuel gas feeding pipe, a fuel exhaust gas discharge pipe, a mixed exhaust gas discharge pipe, and a dilution apparatus. The fuel cell is to generate electricity through electrochemical reaction of an oxidant gas with a fuel gas. The fuel cell includes a cathode side, an anode side, and an electrolyte membrane. The oxidant gas is fed to the cathode side. In the cathode side, an oxidant exhaust gas is generated by using the oxidant gas. The fuel gas is fed to the anode side. In the anode side, a fuel exhaust gas is generated by using the fuel gas. The electrolyte membrane is provided between the cathode side and the anode side. The oxidant gas is fed to the fuel cell through the oxidant gas feeding pipe. The oxidant exhaust gas is discharged from the fuel cell through the oxidant exhaust gas discharge pipe. The fuel gas is fed to the fuel cell through the fuel gas feeding pipe. The fuel exhaust gas is discharged from the fuel cell through the fuel exhaust gas discharge pipe. The mixed exhaust gas discharge pipe connects the oxidant exhaust gas discharge pipe and the fuel exhaust gas discharge pipe. The oxidant exhaust gas and the fuel exhaust gas are discharged from an outlet of the mixed exhaust gas discharge pipe as a mixed exhaust gas. The dilution apparatus is connected to the outlet of the mixed exhaust gas discharge pipe. The dilution apparatus includes a stirring chamber and an opening. The stirring chamber communicates with the mixed exhaust gas discharge pipe and expands from the outlet of the mixed exhaust gas discharge pipe. The opening is provided in the stirring chamber to take in air.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
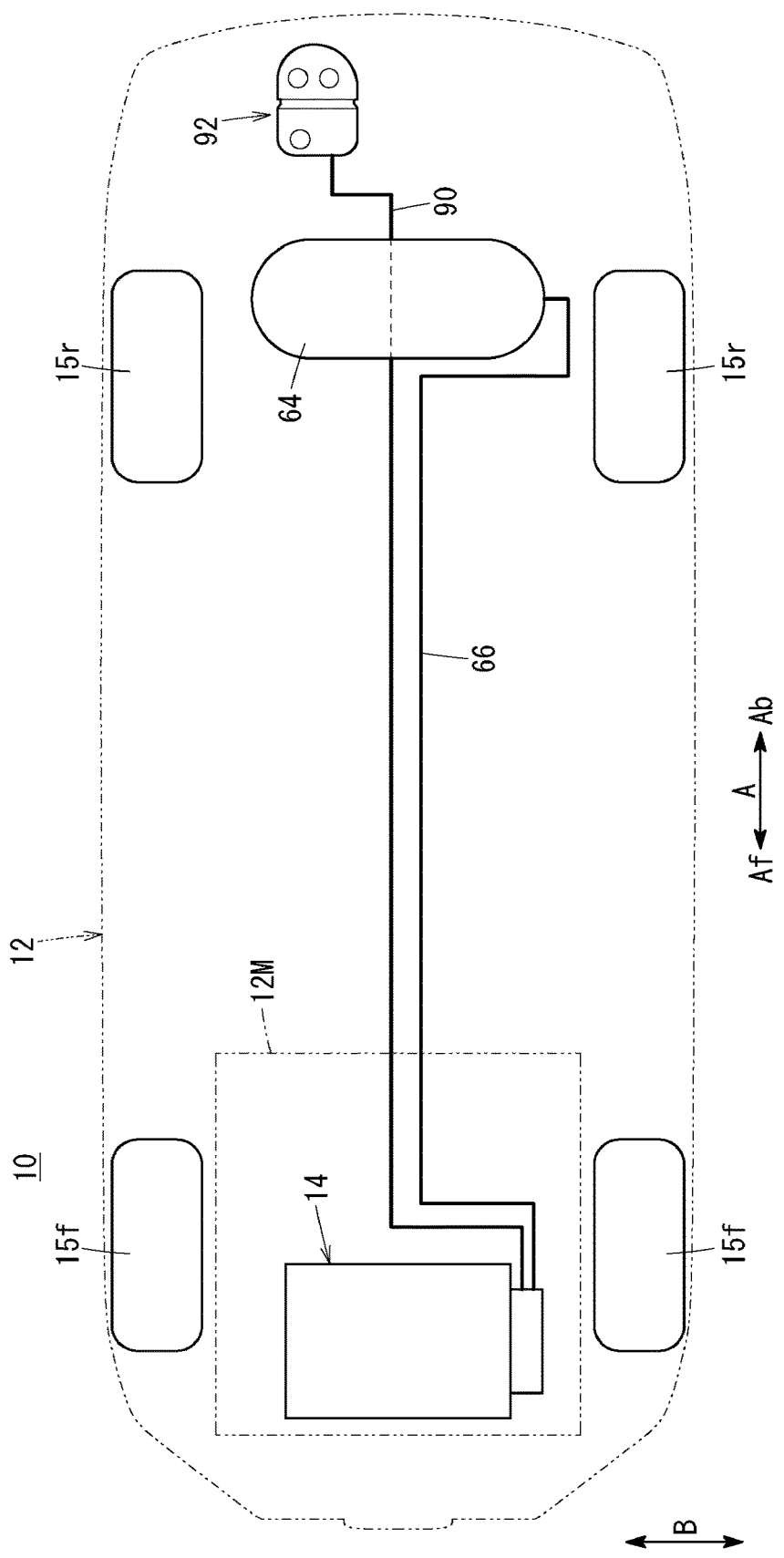
FIG. 1 is a plan view of a fuel cell vehicle equipped with an on-vehicle fuel cell system in accordance with an embodiment of the present disclosure.

The embodiments will now be described with reference to the accompanying drawings, wherein like reference numerals designate corresponding or identical elements throughout the various drawings.

As illustrated in FIG. 1, an on-vehicle fuel cell system 10 in accordance with embodiment of the present disclosure is mounted in a fuel cell vehicle 12 such as a fuel cell electric vehicle. In the fuel cell system 10, a fuel cell stack 14 is disposed in a motor room 12M near front wheels 15f, 15f. A below-mentioned hydrogen tank 64 and a dilution unit (dilution apparatus) 92 are disposed between rear wheels 15r, 15r.

Figure 2:
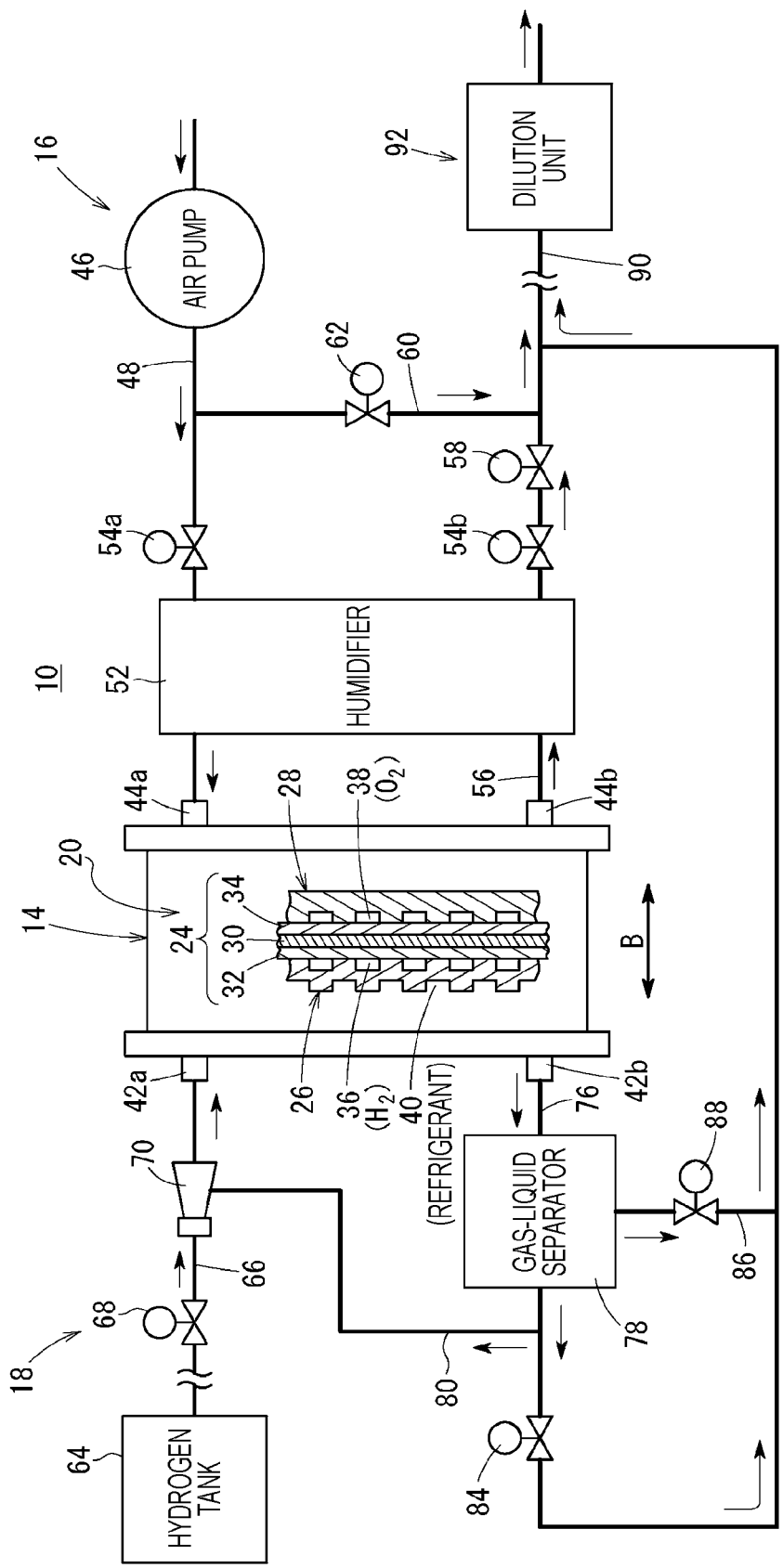
FIG. 2 is a schematic view of the on-vehicle fuel cell system.

As illustrated in FIG. 2, the fuel cell system 10 includes the fuel cell stack 14, an oxidant gas feeder 16 for feeding oxidant gas to the fuel cell stack 14, and a fuel gas feeder 18 for feeding fuel gas to the fuel cell stack 14. The fuel cell system 10 further includes a cooling medium feeder (not illustrated) for feeding a cooling medium to the fuel cell stack 14.

The fuel cell stack 14 is configured by stacking a plurality of power generation cells (fuel cells) 20 in a vehicle width direction (direction indicated by an arrow B) or vehicle longitudinal direction (direction indicated by an arrow A). In the power generation cells 20, an electrolyte membrane electrode assembly 24 is held between a first separator 26 and a second separator 28. The first separator 26 and the second separator 28 each are formed of a metal separator or a carbon separator.

The electrolyte membrane electrode assembly 24 includes a solid polymer electrolyte membrane 30 such as a thin film made of perfluorosulfonic acid containing moisture, and an anode electrode 32 and an cathode electrode 34, which hold the solid polymer electrolyte membrane 30 therebetween. The solid polymer electrolyte membrane 30 is made of a fluorine electrolyte, HC (hydrocarbon) electrolyte, or the like.

A fuel gas channel 36 for feeding fuel gas to the anode electrode 32 is provided between the first separator 26 and the electrolyte membrane electrode assembly 24. An oxidant gas channel 38 for feeding oxidant gas to the cathode electrode 34 is provided between the second separator 28 and the electrolyte membrane electrode assembly 24. A cooling medium channel 40 for circulating a cooling medium is provided between the first separator 26 and the second separator 28.

The fuel cell stack 14 has a fuel gas inlet manifold 42a, a fuel gas outlet manifold 42b, an oxidant gas inlet manifold 44a, and an oxidant gas outlet manifold 44b, which communicate with one another in the stacking direction of the power generation cells 20. The fuel gas inlet manifold 42a and the fuel gas outlet manifold 42b serve to circulate fuel gas such a hydrogen-containing gas (hereinafter also referred to as hydrogen gas). The oxidant gas inlet manifold 44a and the oxidant gas outlet manifold 44b serves to circulate oxidant gas such as oxygen-containing gas (hereinafter also referred to as air).

The oxidant gas feeder 16 includes an air pump (compressor) 46 for compressing air from atmosphere and feeding compressed air, and the air pump 46 is disposed on an air feeding pipe (oxidant gas feeding pipe) 48. The air feeding pipe 48 is provided with a humidifier 52 and an inlet sealing valve 54a downstream of the air pump 46, and communicates with the oxidant gas inlet manifold 44a of the fuel cell stack 14. The air feeding pipe 48 feed air to the fuel cell stack 14.

The oxidant gas outlet manifold 44b of the fuel cell stack 14 communicates with an air discharge pipe (oxidant exhaust gas discharge pipe) 56. The air discharge pipe 56 is provided with the humidifier 52, an outlet sealing valve 54b, and a back sealing valve 58. A bypass channel 60 is located between the humidifier 52 and the air pump 46, and is connected to the air feeding pipe 48 and the air discharge pipe 56. The bypass channel 60 is provided with a bypass valve 62. The fuel cell stack 14 discharges oxidant exhaust gas, which is oxidant gas at least partially used in the cathode electrode 34, via the air discharge pipe 56.

The fuel gas feeder 18 includes the hydrogen tank 64 that stores high-pressure hydrogen, and the hydrogen tank 64 communicates with the fuel gas inlet manifold 42a of the fuel cell stack 14 via a hydrogen feeding pipe (fuel gas feeding pipe) 66. The hydrogen feeding pipe 66 feeds hydrogen to the fuel cell stack 14. The hydrogen feeding pipe 66 is provided with a shutoff valve 68 and an ejector 70.

The fuel gas outlet manifold 42b of the fuel cell stack 14 communicates with an off-gas pipe (fuel exhaust gas discharge pipe) 76. The off-gas pipe 76 derives fuel exhaust gas, which is fuel gas at least partially used in the anode electrode 32, from the fuel cell stack 14. The off-gas pipe 76 is connected to a gas-liquid separator 78, and is connected to the ejector 70 via a circulation channel 80 that branches downstream of the gas-liquid separator 78.

The off-gas pipe 76 is provided with a purge valve 84 located downstream of the circulation channel 80. A drain channel 86 for discharging fluid mainly containing liquid is formed in the bottom of the gas-liquid separator 78. The drain channel 86 is provided with a drain valve 88, and is connected to the off-gas pipe 76 downstream of the purge valve 84. The off-gas pipe 76 merges with the air discharge pipe 56 to form a mixed exhaust gas discharge pipe 90. The mixed exhaust gas discharge pipe 90 discharges a mixture of oxidant exhaust gas and fuel exhaust gas, and the mixed exhaust gas discharge pipe 90 is connected to a dilution unit 92 made of a conductive material.

Figure 3:
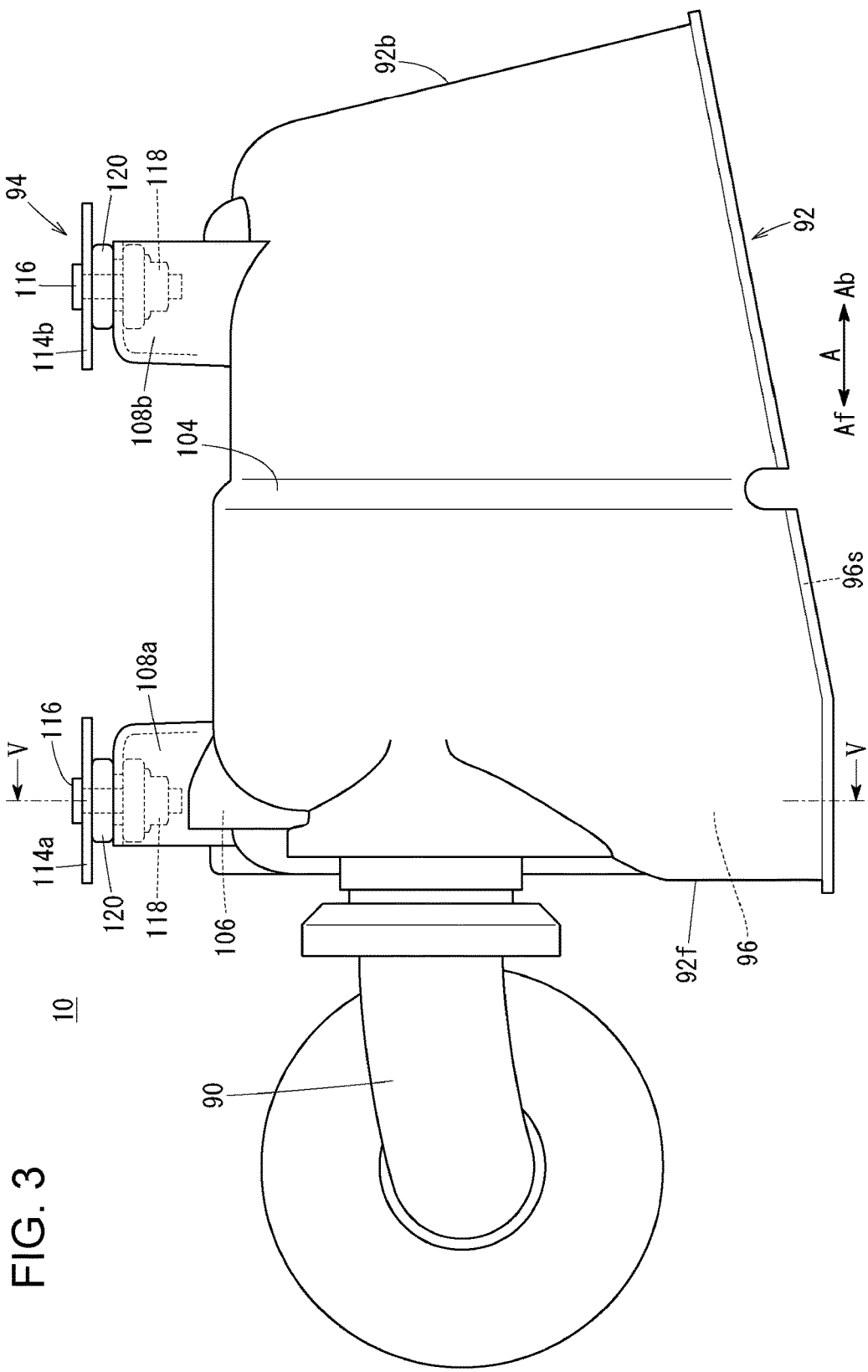
FIG. 3 is a side view of a dilution unit and a mixed exhaust gas discharge pipe, which constitute the on-vehicle fuel cell system.

As illustrated in FIG. 1, the dilution unit 92 is disposed in the rear of the hydrogen tank 64 in the vehicle longitudinal direction (the direction indicated by an arrow Ab), and as illustrated in FIG. 3, is fixed (mounted) to a rear portion of the vehicle using a mount structure 94. As illustrated in FIGS. 3 to 6, the dilution unit 92 is shaped like a bowl opened to the downside, and has a stirring chamber 96. An opening 96s for taking air is formed in the lower face of the stirring chamber 96.

The stirring chamber 96 expands from an outlet 90e of the mixed exhaust gas discharge pipe 90, and communicates with the mixed exhaust gas discharge pipe 90. The mixed exhaust gas discharge pipe 90 is connected to the dilution unit 92 separated upward from a center of the stirring chamber 96 in a vertical direction. A stirring plate 98 is disposed at the outlet 90e of the mixed exhaust gas discharge pipe 90, and enters a flowing area of mixed exhaust gas. The stirring plate 98 is disposed to divide the outlet 90e into two.

The outlet 90e of the mixed exhaust gas discharge pipe 90 is connected to one end (one end of the stirring chamber 96)

Figure 6:
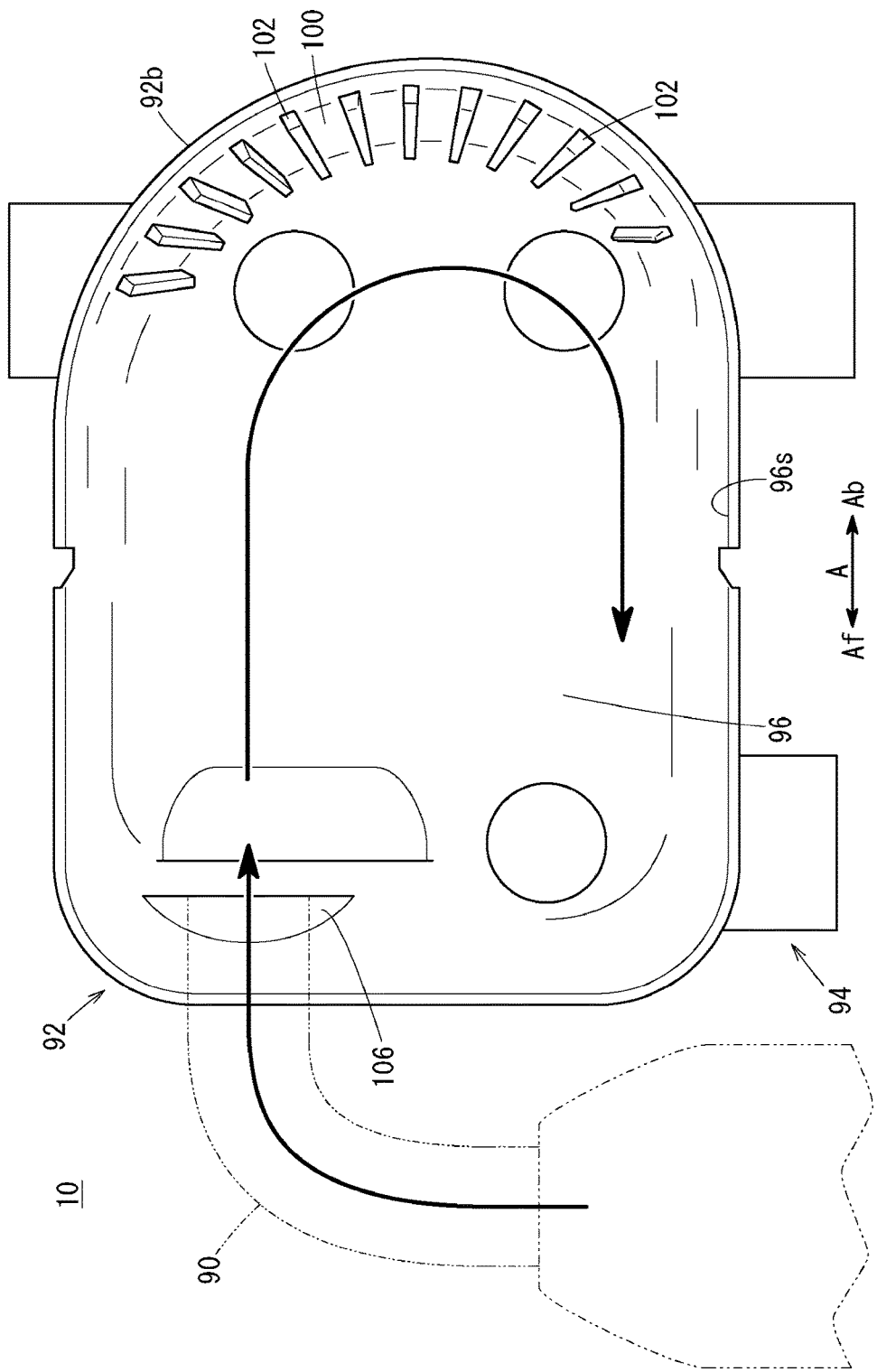
FIG. 6 is a plan view of a bottom cross section of the dilution unit.

92*f* in front of the dilution unit 92 in the vehicle longitudinal direction. The outlet 90*e* is offset from the stirring chamber 96 in the vehicle width direction (direction indicated by an arrow B). As illustrated in FIG. 6, a curved opposite face 100 constituting the stirring chamber 96 is formed on an inner wall face of the other end 92*b* opposite to the one end of the dilution unit 92. A plurality of ribs 102 are formed on the opposite face 100.

Figure 4:
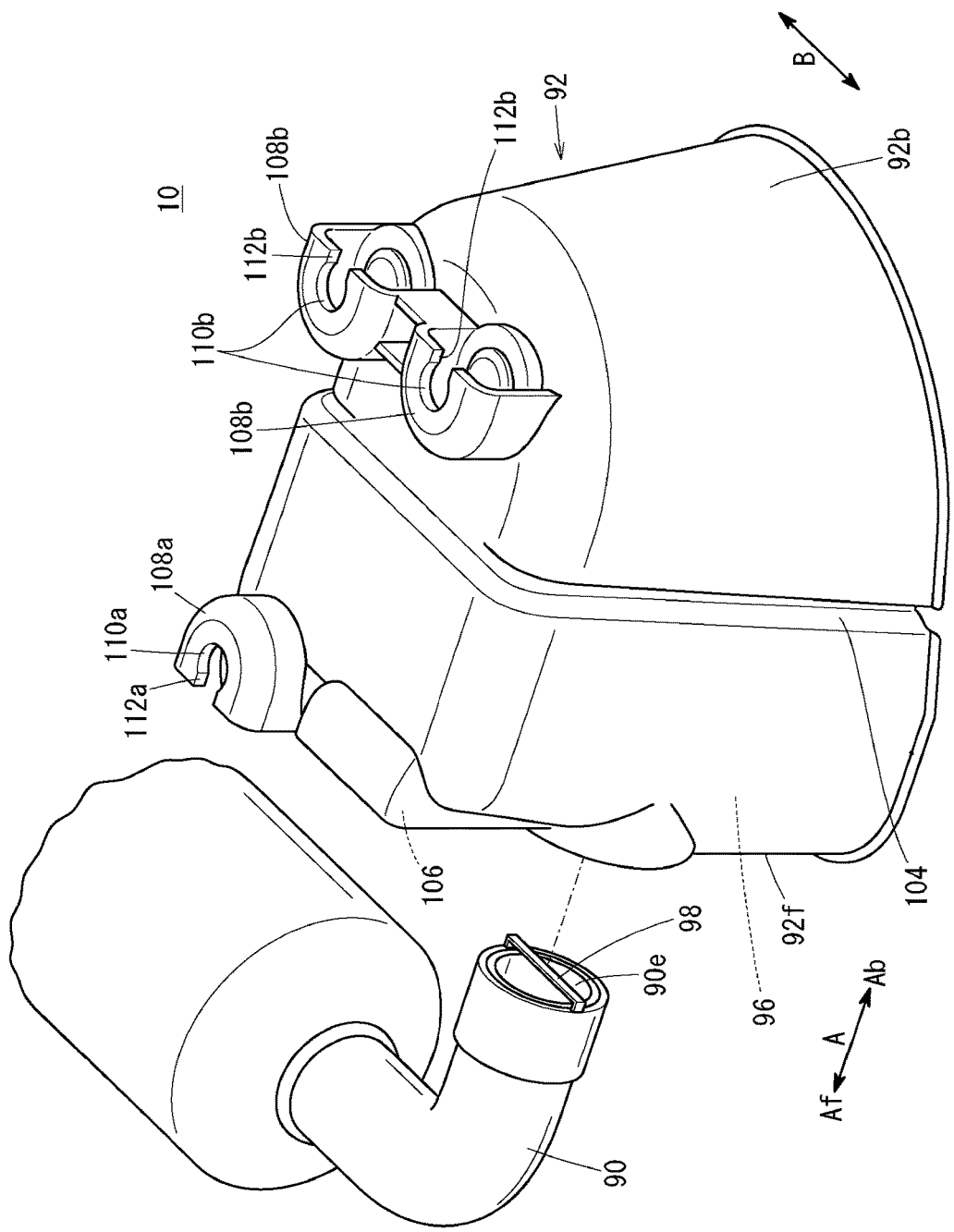
FIG. 4 is an exploded perspective view of the dilution unit and the mixed exhaust gas discharge pipe.
Figure 5:
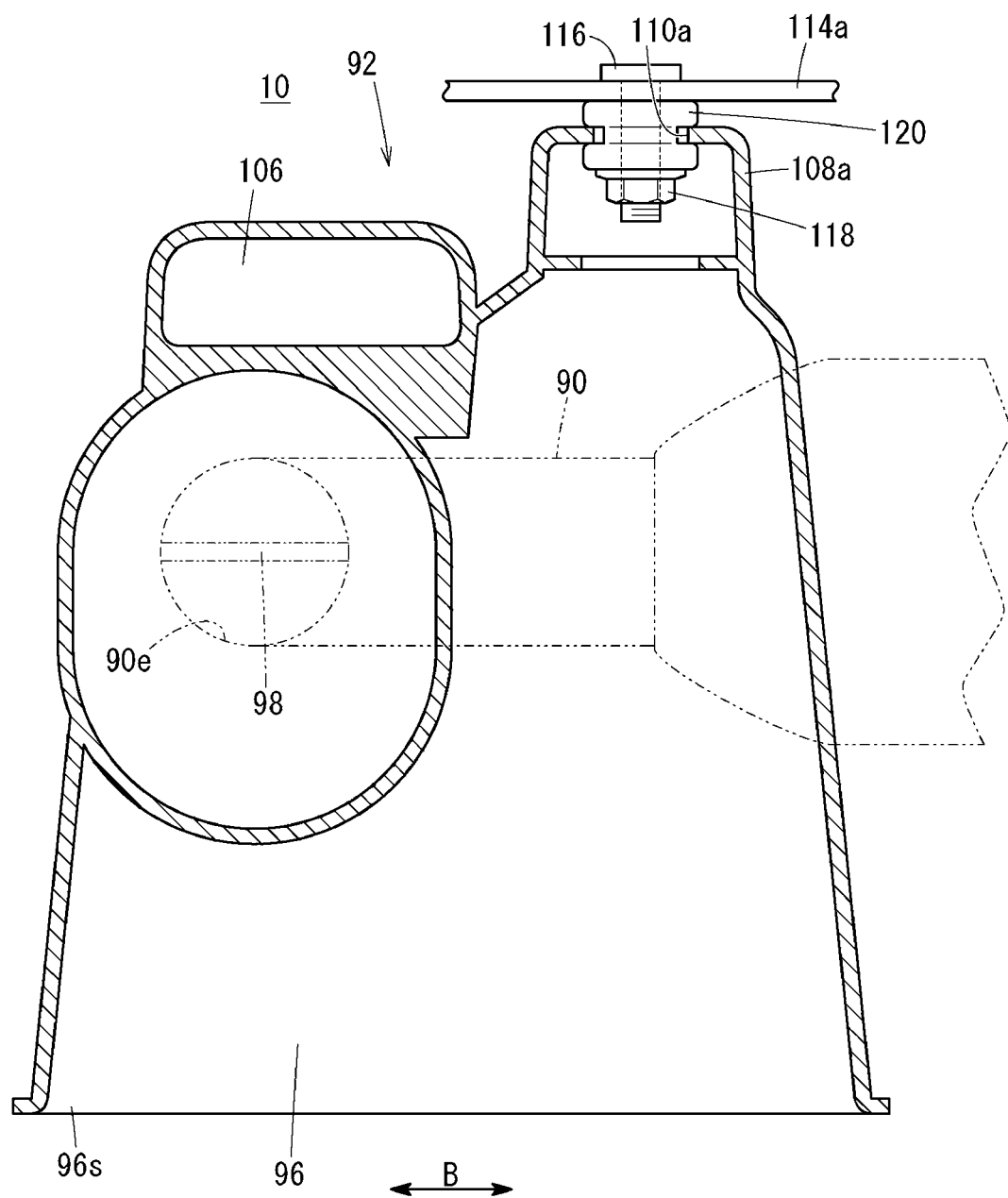
FIG. 5 is a sectional view of the dilution unit taken along a line V-V in FIG. 3.
Figure 7:
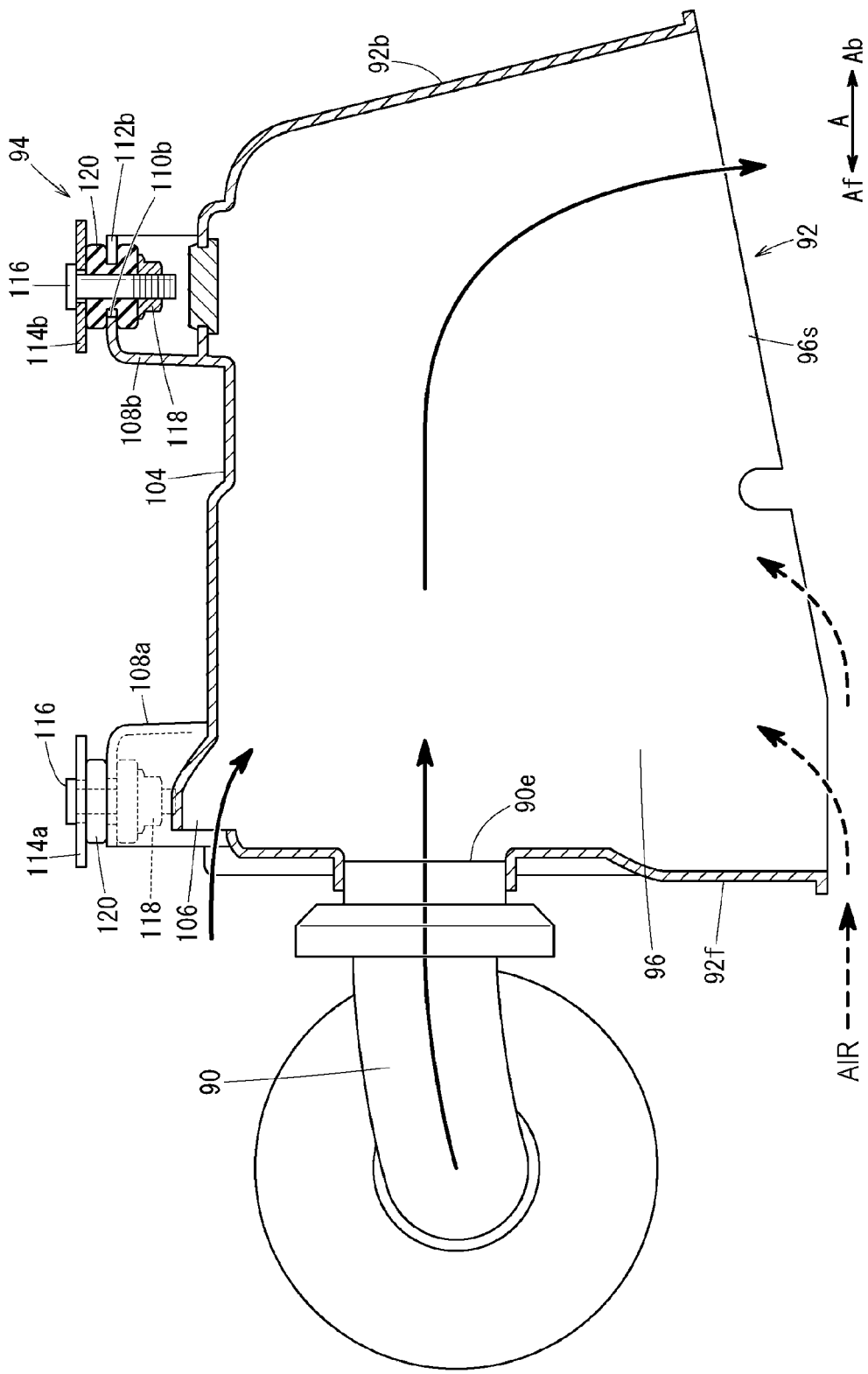
FIG. 7 is a sectional view of the dilution unit.

As illustrated in FIGS. 3 and 4, a stepped portion 104 that extends in the vehicle width direction the dilution unit 92 is formed at the longitudinal center of the upper face of the dilution unit 92. The stepped portion 104 is continuously formed over the upper face and both side faces of the dilution unit 92, and is easily broken, for example, when being subjected to an external load. As illustrated in FIG. 5 and FIG. 7, a vent hole 106 through which the stirring chamber 96 communicates with the outside of the dilution unit 92 is formed on the upper portion of the one end 92*f* of the dilution unit 92 above the connection between the dilution unit 92 and the mixed exhaust gas discharge pipe 90.

As illustrated in FIGS. 4 and 7, the mount structure 94 includes a front flange portion 108*a* provided on the upper portion of the dilution unit 92 on the side of the one end 92*f*, and a pair of rear flange portions 108*b* provided on the upper portion of the dilution unit 92 on the side of the other end 92*b*. The front flange portion 108*a* has a substantially cylindrical shape open to the front, and has an aperture 110*a* on its upper face. The aperture 110*a* communicates with an opening 112*a* opened to the front. Each of the rear flange portions 108*b* has a substantially cylindrical shape open to the rear, and has an aperture 110*b* on its upper face. The apertures 110*b* communicate with respective openings 112*b* opened to the rear.

Figure 8:
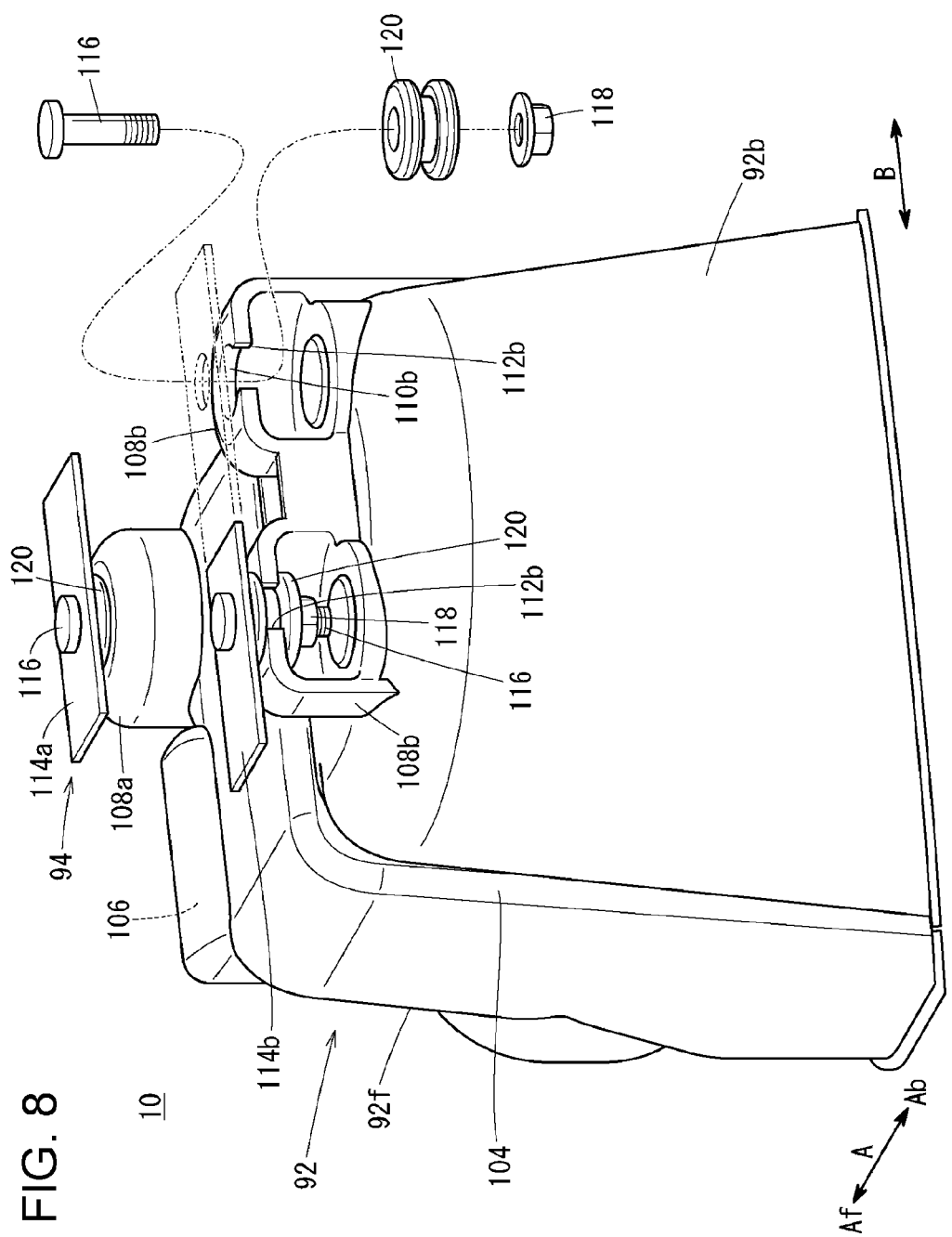
FIG. 8 is a perspective view of the dilution unit and mounts.

As illustrated in FIGS. 3 and 8, the mount structure 94 includes brackets 114*a*, 114*b* provided in the fuel cell vehicle 12. Two rubber mounts (mounts) 120 are attached to the bracket 114*b* via a bolt 116 and two nuts 118. The rubber mounts 120 are attached to the respective apertures 110*b* of the rear flange portions 108*b*. The rubber mounts 120 can pass through the respective openings 112*b*, and be detached to the rear in the vehicle longitudinal direction (direction indicated by an arrow Ab). One rubber mount 120 is attached to the bracket 114*a* via the bolt 116 and the nuts 118.

Operation of the fuel cell system 10 thus configured will be described below.

As illustrated in FIG. 2, oxidant gas (air) is sent to the air feeding pipe 48 via the air pump 46 constituting the oxidant gas feeder 16. The oxidant gas is humidified by the humidifier 52 and then, is fed to the oxidant gas inlet manifold 44*a* of the fuel cell stack 14.

Meanwhile, in the fuel gas feeder 18, during opening of the shutoff valve 68, fuel gas (hydrogen gas) is fed from the hydrogen tank 64 to the hydrogen feeding pipe 66. The fuel gas passes through the ejector 70 and then, is fed to the fuel gas inlet manifold 42*a* of the fuel cell stack 14.

Oxidant gas is introduced from the oxidant gas inlet manifold 44*a* into the oxidant gas channel 38 of the second separator 28, and is fed to the cathode electrode 34 of the electrolyte membrane electrode assembly 24. Fuel gas is introduced from the fuel gas inlet manifold 42*a* into the fuel gas channel 36 of the first separator 26. Fuel gas moves along the fuel gas channel 36, is fed to the anode electrode 32 of the electrolyte membrane electrode assembly 24.

Accordingly, in each electrolyte membrane electrode assembly 24, oxidant gas fed to the cathode electrode 34 and fuel gas fed to the anode electrode 32 are consumed through electrochemical reaction in an electrode catalyst layer to generate electricity. Cooling medium is fed from a cooling medium feeder not illustrated to the cooling medium channel 40.

Next, oxidant exhaust gas, which is oxidant gas that is fed to the cathode electrode 34 and is partially consumed, is discharged from the oxidant gas outlet manifold 44*b* to the air discharge pipe 56. The new oxidant exhaust gas passes through the humidifier 52 and become humidified. Then, the pressure of the oxidant exhaust gas is raised to a set pressure of the back sealing valve 58. After that, the oxidant exhaust gas is discharged to the mixed exhaust gas discharge pipe 90.

Similarly, oxidant exhaust gas, which is oxidant gas that is fed to the anode electrode 32 and is partially consumed, is discharged from the fuel gas outlet manifold 42*b* to the off-gas pipe 76. The fuel exhaust gas is introduced from the off-gas pipe 76 into the gas-liquid separator 78, is deprived of moisture, and is sucked to the ejector 70 via the circulation channel 80.

In the off-gas pipe 76, the purge valve 84 is opened as required to pass fuel exhaust gas discharged from an anode line therethrough, and introduce the fuel exhaust gas along with fluid discharged from the gas-liquid separator 78 via the drain valve 88 into the mixed exhaust gas discharge pipe 90. In the mixed exhaust gas discharge pipe 90, the oxidant exhaust gas is mixed with the fuel exhaust gas to generate mixed exhaust gas, and the mixed exhaust gas is discharged to the dilution unit 92.

In this case, in the present embodiment, as illustrated in FIGS. 6 and 7, the stirring chamber 96 of the dilution unit 92 receives mixed exhaust gas through the mixed exhaust gas discharge pipe 90, and air through the opening 96*s* in the lower face of the stirring chamber 96. For this reason, the stirring chamber 96 can take in oxidant exhaust gas as well as external air such as travelling wind, and dilute and stir the exhaust gas with the external air. Therefore, the dilution unit 92 can reliably dilute fuel exhaust gas with simple and compact structure.

Moreover, as illustrated in FIG. 6, the curved opposite face 100 is formed at the other end 92*b* opposite to the mixed exhaust gas discharge pipe 90 of the stirring chamber 96. Thus, mixed exhaust gas introduced into the stirring chamber 96 can smoothly flow along the curved opposite face 100, promoting stirring without stopping the flow of the mixed exhaust gas. At this time, the curved opposite face 100 can absorb a shock caused when mixed exhaust gas discharged from the mixed exhaust gas discharge pipe 90 is blown against the opposite face 100. Therefore, noise and vibration can be effectively suppressed without increasing the weight and strength of the dilution unit 92 itself.

Further, the plurality of ribs 102 are formed on the opposite face 100. This can properly stir the flow of mixed exhaust gas in the stirring chamber 96. Moreover, the mixed exhaust gas discharge pipe 90 is connected to the dilution unit 92 at a position separated upward from the center of the stirring chamber 96 in the vertical direction. This can increase the discharge distance between the outlet 90*e* of the mixed exhaust gas discharge pipe 90 and the opening 96*s* in the lower face of the stirring chamber 96, diluting exhaust gas with a larger quantity of air.

As illustrated in FIG. 7, the dilution unit 92 has the vent hole 106 that is located above the connection between the dilution unit 92 and the mixed exhaust gas discharge pipe 90, and communicates the stirring chamber 96 with the outside of the dilution unit 92. Therefore, when a negative pressure occurs in the dilution unit 92 to suck air through the opening 96s, unintended disturbance of gas can be prevented, effectively adjusting the flow.

As illustrated in FIG. 4, the stirring plate 98 is disposed at the outlet 90e of the mixed exhaust gas discharge pipe 90, and enters the flowing area of mixed exhaust gas. This can disturb the flow of mixed exhaust gas introduced into the stirring chamber 96 through the outlet 90e, improving the stirring effect.

Figure 9:
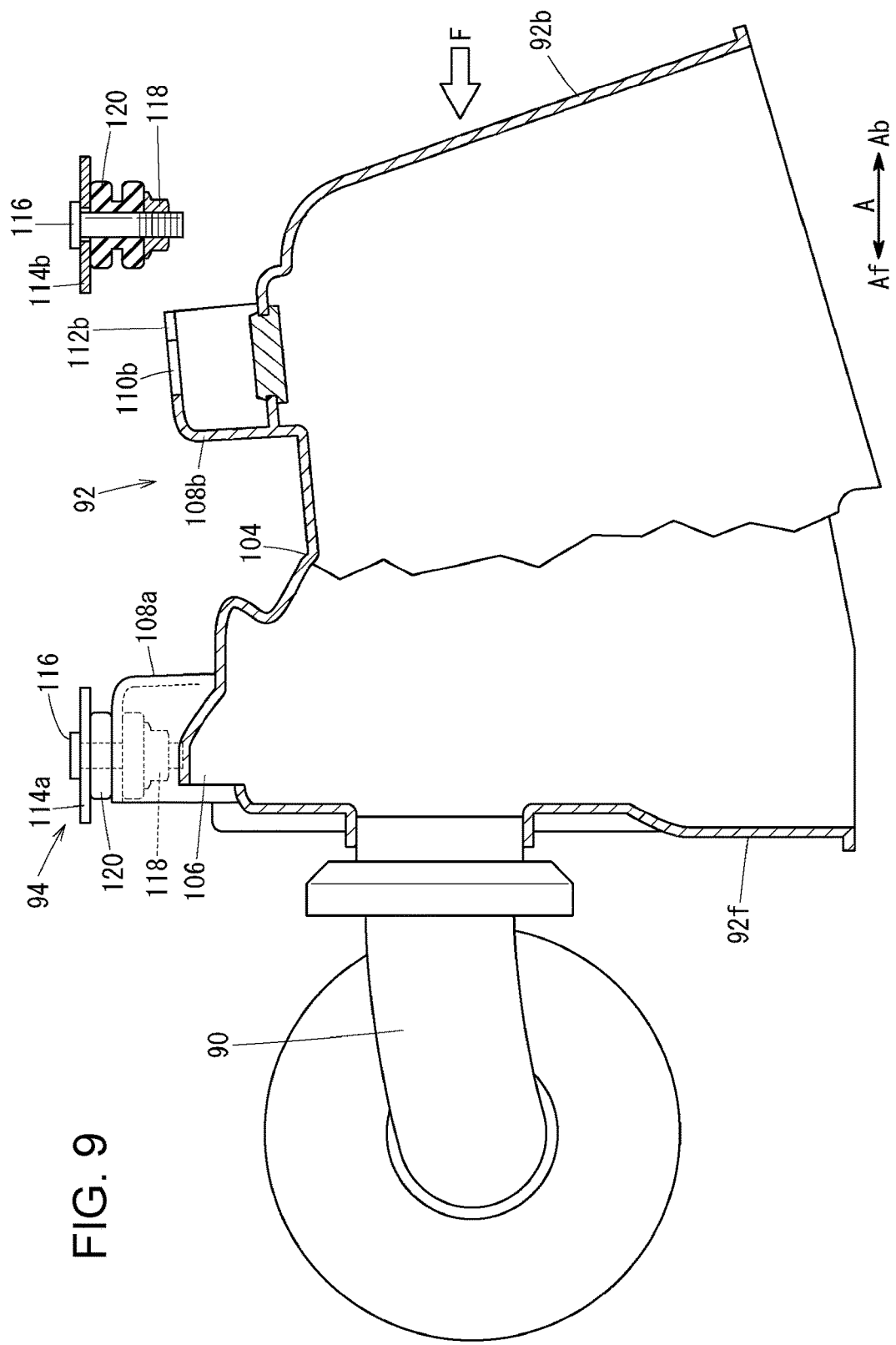
FIG. 9 is a view for describing the operation at inputting of an external load to the dilution unit from the rear side.

As illustrated in FIGS. 3 and 4, the dilution unit 92 is provided with the stepped portion 104 extending in the vehicle width direction at the longitudinal center of the upper face. At this time, as illustrated in FIG. 9, when an external load F is imposed from the rear of the fuel cell vehicle 12, components of the rear portion of the vehicle may contact the other end 92b of the dilution unit 92. For this reason, in the dilution unit 92, stress concentrates on the stepped portion 104, and the dilution unit 92 breaks from the stepped portion 104 at the longitudinal center. Thus, the dilution unit 92 does not move forward, preventing the external load F from imposing onto the hydrogen tank 64.

The dilution unit 92 is fixed to the rear portion of the vehicle using the mount structure 94. As illustrated in FIG. 8, the mount structure 94 includes the rear flange portions 108b to the bracket 114b on the side of the vehicle via the rubber mount 120. The rear flange portions 108b each have the aperture 110b engaging with the rubber mount 120, and the apertures 110b communicate with the respective openings 112b to the rear.

Thus, when the external load F is imposed on the dilution unit 92 from behind, as illustrated in FIG. 9, the rubber mounts 120 can be detached to the rear in the vehicle longitudinal direction (direction indicated by the arrow Ab) through the openings 112 communicating with the apertures 110b. For this reason, for example, even when the dilution unit 92 does not break, the other end 92b of the dilution unit 92 can be detached from the bracket 114b and fall below the vehicle. This can reliably prevent the external load F from imposing on the hydrogen tank 64.

The dilution unit 92 is made of a conductive material. This can prevent the dilution unit 92 from being charged with electricity.

The outlet 90e of the mixed exhaust gas discharge pipe 90 and the dilution unit 92 need not be sealed against each other, and may be connected to each other with a clearance therebetween. At this time, the dilution unit 92 does not necessarily have the vent hole 106. This is due to that the clearance can communicate the stirring chamber 96 to the outside of the dilution unit 92.

The on-vehicle fuel cell system of the present disclosure includes a fuel cell that generate electricity through electrochemical reaction of oxidant gas fed to a cathode side with fuel gas fed to an anode side with an electrolyte membrane being located between the cathode side and the anode side.

The on-vehicle fuel cell system further includes an oxidant gas feeding pipe, an oxidant exhaust gas discharge pipe, a fuel gas feeding pipe, a fuel exhaust gas discharge pipe, a mixed exhaust gas discharge pipe, and a dilution unit. The oxidant gas feeding pipe feeds oxidant gas to the fuel cell, while the oxidant exhaust gas discharge pipe discharges oxidant exhaust gas, which is oxidant gas at least partially used in the cathode side, from the fuel cell.

The fuel gas feeding pipe feeds fuel gas to the fuel cell, while the fuel exhaust gas discharge pipe discharges fuel exhaust gas, which is oxidant gas at least partially used in the anode side, from the fuel cell. The mixed exhaust gas discharge pipe connects the oxidant exhaust gas discharge pipe to the fuel exhaust gas discharge pipe, and discharges mixed exhaust gas of oxidant exhaust gas and fuel exhaust gas, while the dilution unit is connected to the mixed exhaust gas discharge pipe.

The dilution unit includes a stirring chamber that expands from an outlet of the mixed exhaust gas discharge pipe and communicates with the mixed exhaust gas discharge pipe, and an opening for taking air is formed in a lower face of the stirring chamber.

Preferably, the mixed exhaust gas discharge pipe is connected to one end of the stirring chamber on a front side in the vehicle longitudinal direction, and a curved opposite face is formed on an inner wall of another end opposite to the one end of the stirring chamber.

Preferably, in the on-vehicle fuel cell system, a rib is formed on the opposite face.

Preferably, a stepped portion extending in a vehicle width direction is provided on an upper face of the dilution unit at a center portion in the vehicle longitudinal direction.

Preferably, the dilution unit includes a flange portion to be fixed to a mount on a vehicle body side, and the flange portion located in the rear of the stepped portion in the vehicle longitudinal direction has an opening from which the mount is detachable to the rear in the vehicle longitudinal direction.

Preferably, the dilution unit has a vent hole formed therein that is located above a connection between the dilution unit and the mixed exhaust gas discharge pipe, and through which the stirring chamber communicates with outside of the dilution unit.

Preferably, a stirring plate is disposed at the outlet of the mixed exhaust gas discharge pipe, and enters a flowing area of mixed exhaust gas.

Preferably, the mixed exhaust gas discharge pipe is connected to the dilution unit at a position separated upward from a center of the stirring chamber in a vertical direction.

Preferably, the dilution unit is made of a conductive material.

According to the present disclosure, the dilution unit receives mixed exhaust gas of fuel exhaust gas and oxidant exhaust gas through the mixed exhaust gas discharge pipe, and takes in air through the opening in the lower face of the stirring chamber. For this reason, the stirring chamber can take in oxidant exhaust gas as well as external air such as travelling wind, and dilute and stir the exhaust gas with the external air. Therefore, the dilution unit can reliably dilute fuel exhaust gas with simple and compact structure.

Obviously, numerous modifications and variations of the present invention are possible in light of the above teachings. It is therefore to be understood that within the scope of the appended claims, the invention may be practiced otherwise than as specifically described herein.

What is claimed is:

1. An on-vehicle fuel cell system to be mounted in a fuel cell vehicle, the system comprising:
   a fuel cell that generate electricity through electrochemical reaction of oxidant gas fed to a cathode side with fuel gas fed to an anode side with an electrolyte membrane being located between the cathode side and the anode side;
   an oxidant gas feeding pipe that feeds the oxidant gas to the fuel cell;
   an oxidant exhaust gas discharge pipe that discharges, from the fuel cell, oxidant exhaust gas being the oxidant gas at least partially used in the cathode side;
   a fuel gas feeding pipe that feeds the fuel gas to the fuel cell;

a fuel exhaust gas discharge pipe that discharges, from the fuel cell, fuel exhaust gas being the fuel gas at least partially used in the anode side;

a mixed exhaust gas discharge pipe that connects the oxidant exhaust gas discharge pipe to the fuel exhaust gas discharge pipe to discharge mixed exhaust gas of the oxidant exhaust gas and the fuel exhaust gas; and a dilution unit connected to the mixed exhaust gas discharge pipe, into which the mixed exhaust gas is introduced, wherein the dilution unit includes a stirring chamber that expands from an outlet of the mixed exhaust gas discharge pipe and communicates with the mixed exhaust gas discharge pipe, and an opening that takes in air into the stirring chamber is formed in a lower face of the stirring chamber.

2. The on-vehicle fuel cell system according to claim 1, wherein the mixed exhaust gas discharge pipe is connected to one end of the stirring chamber on a front side in a vehicle longitudinal direction, and a curved opposite face is formed on an inner wall face of another end opposite to the one end of the stirring chamber.

3. The on-vehicle fuel cell system according to claim 2, wherein a rib is formed on the opposite face.

4. The on-vehicle fuel cell system according to claim 1, wherein a stepped portion extending in a vehicle width direction is provided on an upper face of the dilution unit at a center portion in the vehicle longitudinal direction.

5. The on-vehicle fuel cell system according to claim 4, wherein the dilution unit includes a flange portion to be fixed to a mount on a vehicle body side, and the flange portion located in the rear of the stepped portion in the vehicle longitudinal direction has an opening from which the mount is detachable to the rear in the vehicle longitudinal direction.

6. The on-vehicle fuel cell system according to claim 1, wherein the dilution unit has a vent hole formed therein that is located above a connection between the dilution unit and the mixed exhaust gas discharge pipe, and through which the stirring chamber communicates with outside of the dilution unit.

7. The on-vehicle fuel cell system according to claim 1, wherein a stirring plate is disposed at the outlet of the mixed exhaust gas discharge pipe, and enters a flowing area of mixed exhaust gas.

8. The on-vehicle fuel cell system according to claim 1, wherein the mixed exhaust gas discharge pipe is connected to the dilution unit at a position separated upward from a center of the stirring chamber in a vertical direction.

9. The on-vehicle fuel cell system according to claim 1, wherein the dilution unit is made of a conductive material.

10. An on-vehicle fuel cell system comprising:

a fuel cell to generate electricity through electrochemical reaction of an oxidant gas with a fuel gas, the fuel cell comprising:

a cathode side to which the oxidant gas is fed and in which an oxidant exhaust gas is generated by using the oxidant gas;

an anode side to which the fuel gas is fed and in which a fuel exhaust gas is generated by using the fuel gas; and an electrolyte membrane provided between the cathode side and the anode side;

an oxidant gas feeding pipe through which the oxidant gas is fed to the fuel cell;

an oxidant exhaust gas discharge pipe through which the oxidant exhaust gas is discharged from the fuel cell;

a fuel gas feeding pipe through which the fuel gas is fed to the fuel cell;

a fuel exhaust gas discharge pipe through which the fuel exhaust gas is discharged from the fuel cell;

a mixed exhaust gas discharge pipe connecting the oxidant exhaust gas discharge pipe and the fuel exhaust gas discharge pipe, the oxidant exhaust gas and the fuel exhaust gas being discharged from an outlet of the mixed exhaust gas discharge pipe as a mixed exhaust gas; and a dilution apparatus connected to the outlet of the mixed exhaust gas discharge pipe into which the mixed exhaust gas is introduced, and comprising:

a stirring chamber communicating with the mixed exhaust gas discharge pipe and expanding from the outlet of the mixed exhaust gas discharge pipe; and an opening provided in the stirring chamber to take in air into the stirring chamber.

11. The on-vehicle fuel cell system according to claim 10, wherein the on-vehicle fuel cell system is configured to be mounted in a fuel cell vehicle having a vehicle height direction, wherein the stirring chamber has a lower surface and an upper face opposite to the lower face in the vehicle height direction, and wherein the opening is provided in the lower face of the stirring member.

12. The on-vehicle fuel cell system according to claim 11, wherein the mixed exhaust gas discharge pipe is connected to one end of the stirring chamber on a front side in a vehicle longitudinal direction of the fuel cell vehicle, and wherein a curved opposite face is provided on an inner wall face of another end opposite to the one end of the stirring chamber.

13. The on-vehicle fuel cell system according to claim 12, wherein a rib is formed on the curved opposite face.

14. The on-vehicle fuel cell system according to claim 11, wherein a stepped portion extending in a vehicle width direction of the fuel cell vehicle is provided on an upper face of the dilution apparatus at a center portion in a vehicle longitudinal direction of the fuel cell vehicle.

15. The on-vehicle fuel cell system according to claim 14, wherein the dilution apparatus includes a flange portion to be fixed to a mount on a vehicle body side, and the flange portion located in the rear of the stepped portion in the vehicle longitudinal direction has an opening from which the mount is detachable to the rear in the vehicle longitudinal direction.

16. The on-vehicle fuel cell system according to claim 10, wherein the dilution apparatus has a vent hole formed therein that is located above a connection between the dilution apparatus and the mixed exhaust gas discharge pipe, and through which the stirring chamber communicates with outside of the dilution apparatus.

17. The on-vehicle fuel cell system according to claim 10, wherein a stirring plate is disposed at the outlet of the mixed exhaust gas discharge pipe, and enters a flowing area of mixed exhaust gas.

18. The on-vehicle fuel cell system according to claim 10, wherein the mixed exhaust gas discharge pipe is connected to the dilution apparatus at a position separated upward from a center of the stirring chamber in a vertical direction.

19. The on-vehicle fuel cell system according to claim 10, wherein the dilution apparatus is made of a conductive material.

20. The on-vehicle fuel cell system according to claim 11, wherein the oxidant gas is at least partly used in the cathode side, and wherein the fuel gas is at least partly used in the anode side.

\* \* \* \* \*